(12) United States Patent
Liu

(10) Patent No.: US 11,264,051 B1
(45) Date of Patent: Mar. 1, 2022

(54) CAPACITIVE ONE TURN (C1T) PERPENDICULAR MAGNETIC RECORDING (PMR) WRITER DESIGNS

(71) Applicant: Headway Technologies, Inc., Milpitas, CA (US)

(72) Inventor: Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 11 days.

(21) Appl. No.: 17/001,792

(22) Filed: Aug. 25, 2020

(51) Int. Cl.
  *G11B 5/127* (2006.01)
  *G11B 5/31* (2006.01)
  *G11B 5/02* (2006.01)

(52) U.S. Cl.
  CPC .............. *G11B 5/1278* (2013.01); *G11B 5/02* (2013.01); *G11B 5/3163* (2013.01)

(58) Field of Classification Search
  CPC ......... G11B 5/29; G11B 5/265; G11B 5/6082; G11B 5/4813; G11B 5/17; G11B 5/09; G11B 5/1278; G11B 5/02; G11B 5/3163
  See application file for complete search history.

(56) References Cited

U.S. PATENT DOCUMENTS

| | | | | |
|---|---|---|---|---|
| 6,603,623 B1* | 8/2003 | Fontana, Jr. | ............ | G11B 5/012 360/123.36 |
| 7,359,149 B2* | 4/2008 | Kiyono | ............... | G11B 5/3967 360/125.33 |
| 8,462,466 B2* | 6/2013 | Huber | ................. | G11B 5/4806 360/246 |
| 8,531,800 B1* | 9/2013 | Contreras | ............ | G11B 5/3123 360/246 |
| 8,824,077 B2 | 9/2014 | Contreras et al. | | |
| 8,891,189 B1* | 11/2014 | Contreras | ................ | G11B 5/02 360/46 |
| 8,934,189 B2* | 1/2015 | Biskeborn | .............. | G11B 5/187 360/66 |
| 9,269,377 B2* | 2/2016 | Gubbins | .............. | G11B 5/6005 |

(Continued)

OTHER PUBLICATIONS

"Wide Band Frequency Characterization of Al-Doped and Undoped Rutile TiO2₂ Thin Films for MIM Capacitors," by Ahmad Chaker et al., IEEE Electron Device Letters, vol. 38, No. 3, Mar. 2017, pp. 375-378.

*Primary Examiner* — Brian E Miller
(74) *Attorney, Agent, or Firm* — Saile Ackerman LLC; Stephen B. Ackerman

(57) ABSTRACT

A PMR writer with a capacitive one turn design is disclosed with a one turn top coil above the main pole (MP), a one turn bottom coil below the MP, and where a capacitor (C_bot) is electrically connected to the bottom coil thereby shunting the write current (lw) in the bottom coil above certain frequencies proximate to 1 GHz. The C_bot is made of $TiO_2$ or Al-doped $TiO_2$, for example, with a dielectric constant >10. As a result, the writer behaves like a 1+1T writer at lw frequencies substantially below 1 GHz, as a 1+0.xT writer at lw frequencies proximate to 1 GHz, and like a 1+0T writer in an overshoot region of the lw. Accordingly, better trailing shield field gradient, signal-to-noise ratio, and bit error rate during high frequency operation are achieved without compromising saturation speed and adjacent track interference for an overall improvement in performance.

13 Claims, 15 Drawing Sheets

(56) References Cited

U.S. PATENT DOCUMENTS

| | | | |
|---|---|---|---|
| 9,530,437 B2* | 12/2016 | Shibuya | G11B 5/02 |
| 10,204,734 B2 | 2/2019 | Hirobe et al. | |
| 10,332,548 B2 | 6/2019 | Higashi et al. | |
| 10,418,054 B1 | 9/2019 | Liu | |
| 10,643,640 B1* | 5/2020 | Liu | G11B 5/012 |
| 10,916,261 B1* | 2/2021 | Liu | G11B 5/315 |
| 2008/0112080 A1* | 5/2008 | Lengsfield | G11B 5/17 360/125.04 |
| 2010/0254041 A1* | 10/2010 | Alex | G11B 5/1278 360/123.02 |
| 2015/0103437 A1* | 4/2015 | Watanabe | G11B 5/40 360/111 |
| 2016/0111118 A1* | 4/2016 | Funayama | G11B 5/4853 360/234.3 |

* cited by examiner

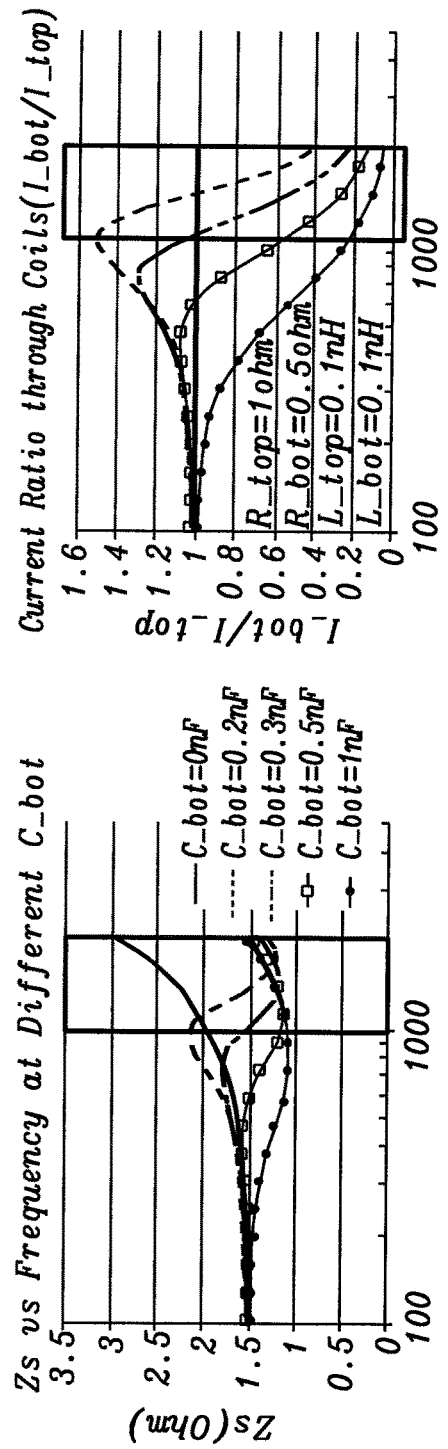
FIG. 13D
FIG. 13C
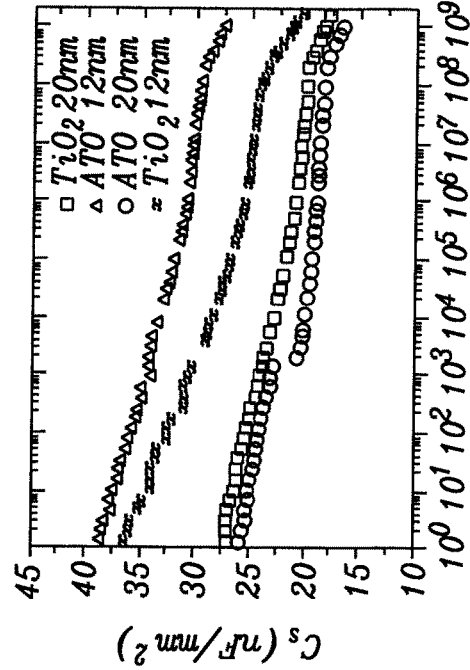
FIG. 14B
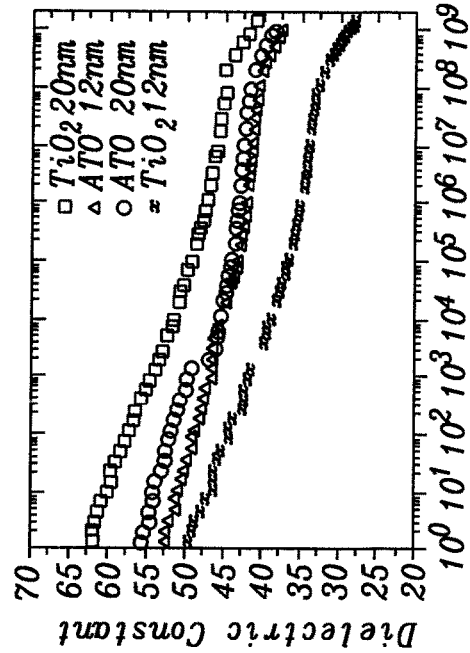
FIG. 14A

CAPACITIVE ONE TURN (C1T) PERPENDICULAR MAGNETIC RECORDING (PMR) WRITER DESIGNS

RELATED PATENT APPLICATIONS

This application is related to the following: U.S. Pat. Nos. 10,418,054; 10,777,220; and 10,643,640; which are assigned to a common assignee and herein incorporated by reference in their entirety.

TECHNICAL FIELD

The present disclosure relates to a PMR write head configured to have a capacitive one turn (C1T) coil design where a capacitor (C_bot) is applied across the bottom (bucking) coil and is compatible with various base writer structures so that the writer behaves like a typical 1+1T writer at low frequency writing, but performs as a 1+0.xT writer at high frequency where the bucking coil contributes only a portion of its full power, and like a 1+0T writer in an overshoot region where the write current passes through the capacitor to shunt the bottom loop, thereby enabling better trailing shield gradient, signal to noise ratio (SNR), and bit error rate (BER) while maintaining saturation speed, adjacent track interference (ATI) and wide adjacent track erasure (WATE).

BACKGROUND

A PMR write head typically has a main pole layer with a small surface area (pole tip) at an ABS, and coils that conduct a current and generate a magnetic flux in the main pole such that the magnetic flux exits through the pole tip and enters a magnetic medium (disk) adjacent to the ABS. Magnetic flux is used to write a selected number of bits in the magnetic medium and typically returns to the main pole (MP) through two pathways including a trailing loop and a leading (bottom) loop. The trailing loop is comprised a trailing shield structure (TH1) with a front side at the ABS, and an uppermost (PP3) trailing shield (TS) that may be recessed from the ABS and arches over the driving coil to connect with a top yoke (TY). In some designs, the PP3 TS is exposed at the ABS for fewer process steps when WATE from the PP3 TS, and PP3 TS to TH1 is manageable, and a larger metal surface is exposed at the ABS to satisfy thermo-mechanical (T/M) requirements. The TY adjoins a top surface of the MP above a back gap connection (BGC). The trailing loop is also known as the top driving loop and delivers magnetic flux to the MP tip to write positive and negative field into magnetic media. The leading (bottom) loop has a leading shield with a side at the ABS and in some schemes is connected to a return path (RTP) having a front side recessed from the ABS. The RTP extends back to the BGC and enables magnetic flux in the leading loop pathway to return from the leading shield at the ABS and through the BGC to the MP.

Dual write shield (DWS) designs that feature complete leading and trailing loops were invented for faster saturation speed and better WATE by reducing stray field in side shields and in the leading shield and trailing shields. However, a non-DWS (nDWS) design where essentially all of the leading loop is removed except for the leading shield has proven beneficial in providing a better return field at the MP trailing edge thereby improving field gradient, BER, and ADC compared with a DWS scheme. At low frequency, a DWS design with a "strong" bottom loop will help write field strength and improve low frequency writability without trailing shield gradient trade off. At high frequency, however, a strong bottom loop may cause less flux return to the trailing shield (TS), worse TS field gradient, and a degradation in high frequency SNR and BER.

To achieve areal density in a hard disk drive (HDD) beyond 2 terabytes per platter (TBPP) for conventional PMR in near line applications, OD high data rate (HDR) performance up to 3.4 gigabytes per second (Gbps) or 1.7 gigahertz (GHz) is essential and critical. A one turn coil design (1+1T) with one turn in each of the bucking and driving coils has demonstrated better HDR performance than a two turn coil design (1+1+2T or 2+2T) because of less electrical inductance and a more compact magnetic loop with shorter yoke length (YL). Magneto-motive force (MMF) of a one turn coil design is half that of a 2+2T design. Under direct current (DC) or low frequency alternating current (AC) applications, a one turn coil writer requires two times the current of a two turn coil writer to drive a head to the same magnetic field level. However, under high frequency for HDR applications, the 1+1T design has demonstrated an advantage in reaching the same magnetic field level with 1.2-1.5 times the current of a two turn coil design for 1.75 TBPP applications with a data rate up to 3.1 Gbps (1.55 GHz). An improved 1+1T design was disclosed in related U.S. Pat. No. 10,643,640 with an ultimate double yoke (uDY) for the top yoke and with multiple base writer schemes that delivers a faster writer with a lower lw0-pk (0 to peak current) at outer diameter (OD) operation. However, a writer is needed with better trailing shield gradient, SNR, and BER while maintaining saturation speed, ATI and WATE during high frequency operation for an overall improvement in HDR performance.

SUMMARY

One objective of the present disclosure is to provide a PMR writer with a 1+1T coil layout that behaves like a 1+1T writer at low frequency, a 1+0.xT writer at high frequency, and a 1+0T writer in an overshoot region of the write scheme.

Another objective of the present disclosure is to provide a PMR writer according to the first objective that is compatible with various base writer designs.

A third objective of the present disclosure is to provide a method of fabricating a PMR writer that satisfies the first two objectives.

These objectives are achieved by configuring a PMR writer in a capacitive one turn (C1T) design wherein a C1T capacitor (C_bot) is applied across the bottom coil in a 1+1T coil scheme, and may have one electrode connected to the center tap (interconnect between top and bottom coils), and a second electrode connected to the bottom coil pad to shunt the bottom coil at high frequency. Optionally, the C1T capacitor may be formed below the reader in a combined read-write head but this scheme is not preferred because the capacitor needs to be built at the beginning of the head process before the reader, and vias are required to be built all the way up for connections to the center tap and bottom coil pad. The capacitance of the C1T capacitor is maintained from 0.1-1 nanoFarad (nF), and preferably from 0.1-0.5 nF for the 1+1T writers described in the embodiments of the present disclosure. The C1T capacitor is preferably comprised of a material such as TaOx, TiOx, $TiO_2$, or Al doped $TiO_2$ (ATO) having a dielectric constant >10. The area and thickness of the C1T capacitor are adjusted to achieve the desired target capacitance. For example, a C1T capacitor made of TaOx and with a thickness ≤75 nm and an area ≥0.0155 mm$^2$ delivers a capacitance of around 50 pF (pico-Farad).

In some embodiments, the writer may have a so-called ultimate double yoke (uDY) scheme where a top yoke (TY) extension is formed below the driving coil and has a down-track thickness equal to that of the TY back portion that is below the uppermost (PP3) trailing shield, and has a yoke length (YL) of 2 to 2.6 microns from the ABS to the TY front side. The TY extension front side is separated from a backside of the second trailing shield (TS) also known as the write shield (WS) by a dielectric layer. The uDY design enables faster saturation speed and improved ATI/WATE performance that is needed for 2TBPP applications.

The writer structure is not limited to a single PMR writer, but may also be incorporated in each writer of a selectable dual writer (SDW), or in each writer of a selectable triple writer (STW) on a slider. Writers in the SDW or STW schemes may have shared PP3 TS, WS, side shields (SS), and leading shields (LS), but a separate first TS (hot seed layer), TY/TY extensions, MP, tapered bottom yokes, and bottom yokes. The "selectable" aspect of a SDW or STW relates to selectively activating the writer with the better/best performance while the one or more other writers remain inactive during a write process.

The present disclosure also encompasses a method for fabricating a capacitor below a bottom coil in a PMR writer. The process flow begins by providing a first insulation layer above a RTP. A first photoresist mask is formed on the first insulation layer from the eventual ABS plane to a first height (h). Next, a bottom electrode layer (BE) is deposited on the first insulation layer and a BE front portion is aligned below where the center tap will eventually be deposited. After the first photoresist mask is removed, a second photoresist mask is formed from the ABS plane to a second height (h1) where h1>h so that the BE front portion is protected. Then, the C1T capacitor such as TiOx with a 500 Angstrom thickness, for example, and a top electrode layer (TE) are sequentially deposited on unprotected regions of the BE. The second photoresist mask is removed and then a third photoresist mask with openings corresponding to the desired bucking coil shape is formed on the first insulation layer, front BE portion, and on the BE/C1T capacitor/TE stack beyond the second height from the ABS plane. Thereafter, the bucking coil is plated and a chemical mechanical polish (CMP) process is performed to provide a planar top surface. A center portion of the bucking coil contacts the BE front portion, and in a subsequent step, the center tap will be deposited on the bucking coil center portion. Moreover, a back portion of the bucking coil (bucking coil lead) contacts the TE on the BE/C1T capacitor/TE stack. At this point, the third photoresist mask is removed and a well known process of record (POR) is followed to complete the writer structure. The method described above has the capacitor BE contacting the bottom coil below the center tap, and the capacitor TE contacting the bucking coil lead or pad. Although the bucking coil and capacitor have substantial overlap in the exemplary embodiment, they may have no overlap area in an alternative embodiment where a first lead connects the bucking coil center portion with the TE, and a second lead connects the BE and bucking coil pad.

BRIEF DESCRIPTION OF THE DRAWINGS

FIGS. 13A-13D show modeling results of a C1T design with the equivalent circuit in FIG. 8B where R_top=1 ohm, R_bot=0.5 ohm, L_top=L_bot=0.1 nH, and C_bot is varied between 0 nF and 1 nF.

FIGS. 14A-14B show plots of dielectric constant vs. frequency, and capacitance vs. frequency, respectively, for $TiO_2$ and aluminum doped $TiO_2$ (ATO) films and are taken from IEEE Electron Letters 2017 DOI: 10.1109/led.2017.2654513.

DETAILED DESCRIPTION

Figure 1:
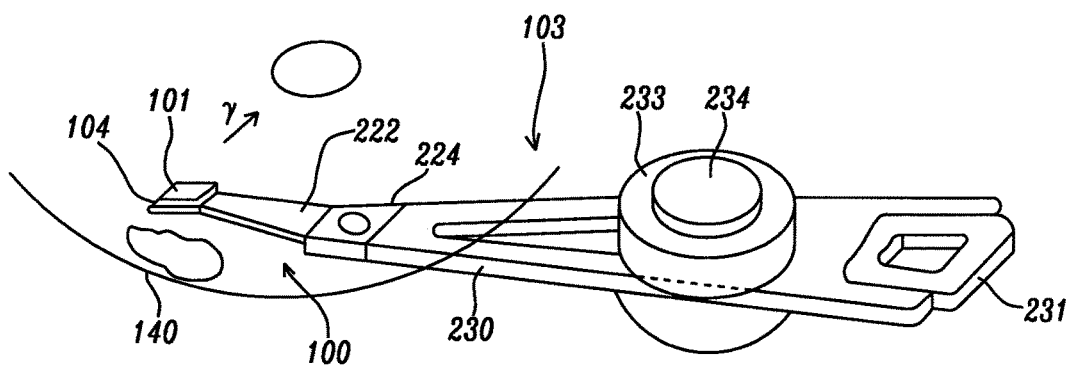
FIG. 1 is a perspective view of a head arm assembly of the present disclosure.

The present disclosure relates to a PMR writer having a C1T coil design where a C1T capacitor (C_bot) is electrically connected to the bottom coil in a 1+1T scheme so that current is shunted from the bottom coil during high frequency operations and the writer performs in a 1+0.xT or 1+0T mode. In general, high frequency (HF) is defined by the base frequency, middle frequency (MF) is defined by dividing the base frequency by 2, and low frequency is defined by dividing the base frequency by 3. For example, if the base frequency is 1T (one time period) corresponding to 1.5 GHz, 2T also called middle frequency (MF) means 1500 MHz/2=750 MHz, and 3T also called low frequency means 1500 MHz/3=500 MHz. A 1+0.4T mode means that the top (driving) coil has full driving power while the bucking coil contributes only 40% of its full power, and a 1+0T mode means the bucking coil contributes essentially no power during a write process.

In the drawings, the y-axis is a cross-track direction, the z-axis is a down-track direction, and the x-axis is in a direction orthogonal to the ABS and towards a back end of the device. Dimensions of writer components are expressed as a width in the y-axis direction, height in the x-axis direction, and thickness in the z-axis direction. The term "front side" is defined as the side of a layer that faces the ABS or is at the ABS while a "backside" is a side facing away from the ABS. The bottom coil (BC) is also referred to as the bucking coil, and the top coil (TC) is also known as the driving coil. A front portion of a layer is a portion that is closer to the ABS than a back portion. The terms "dielectric" and "insulation" may be used interchangeably when referring to non-magnetic layers.

Although the exemplary embodiments relate to a single PMR writer, we described in related U.S. Pat. No. 10,418,054 that a single writer structure shown in FIG. 4 may be duplicated to provide a second writer on a single slider to form a dual PMR writer also referred to as a selectable dual writer (SDW). Similarly, a third writer may be simultaneously formed on an opposite side of the second writer to yield a selectable triple writer (STW).

Referring to FIG. 1, a head gimbal assembly (HGA) 100 includes a magnetic recording head 101 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 101 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
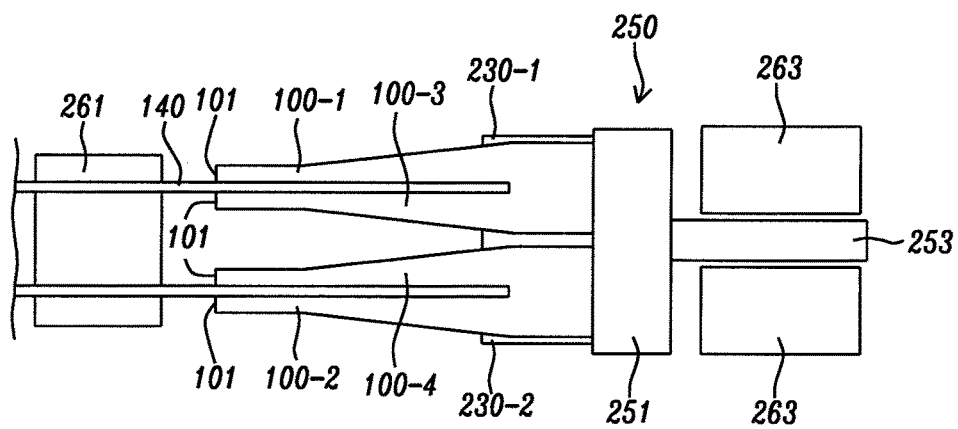
FIG. 2 is side view of a head stack assembly of the present disclosure.

Next, a side view of a head stack assembly (FIG. 2) and a plan view of a magnetic recording apparatus (FIG. 3) wherein the magnetic recording head 101 is incorporated are depicted. The head stack assembly 250 is a member to which a plurality of HGAs (HGA 100-1 and HGA 100-2 are at outer positions while HGA 100-3 and HGA 100-4 are at inner positions in the illustration) is mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
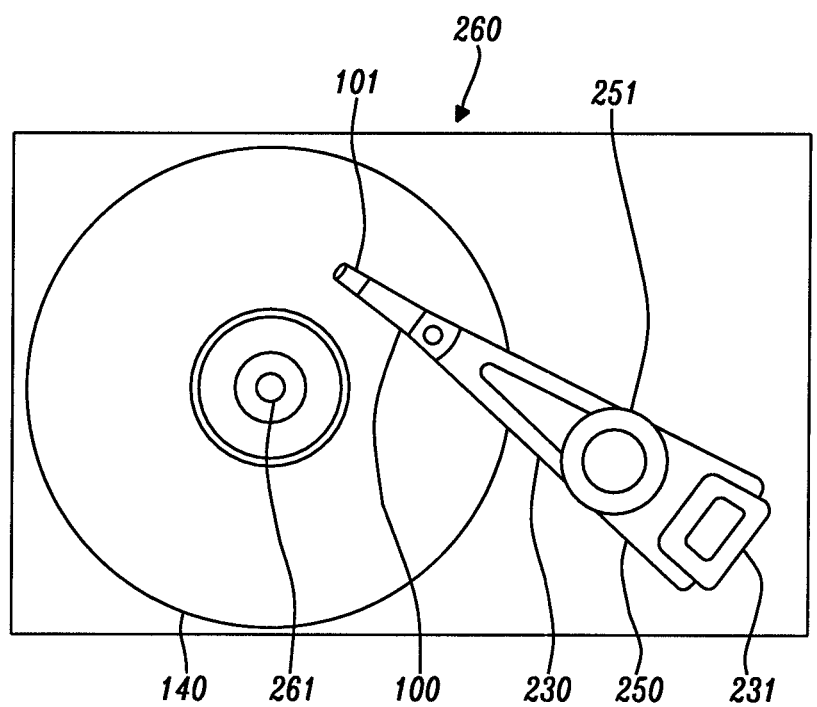
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 101 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
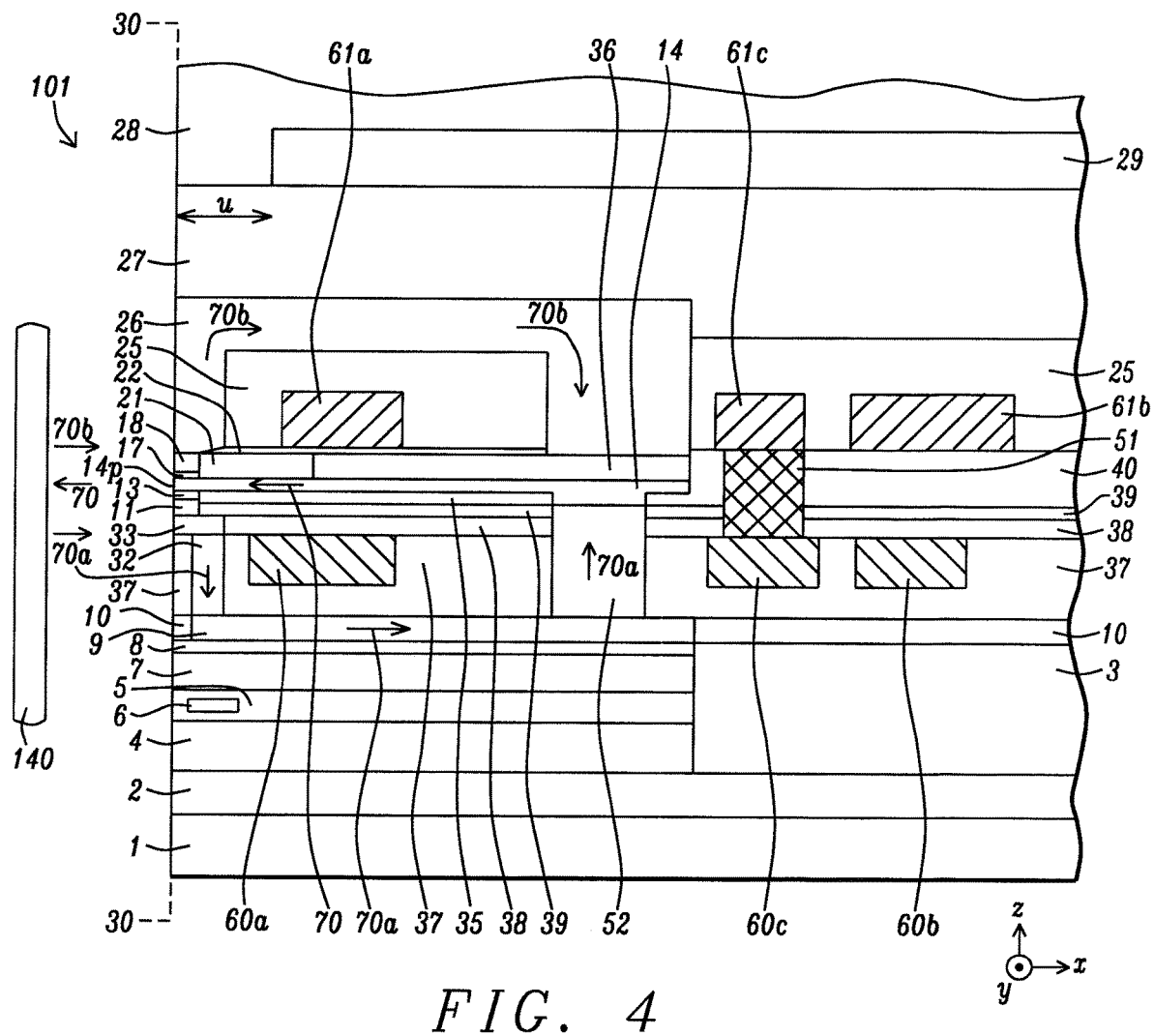
FIG. 4 is a down-track cross-sectional view of a combined read-write head according to an embodiment of the present disclosure.

In FIG. 4, a single PMR writer with a combined read head/write head structure 101 according to an embodiment of the present disclosure is depicted in a cross-sectional view from a plane that is orthogonal to an air-bearing surface (ABS) 30-30. The combined read/write head is formed on a substrate 1 that may be comprised of AlTiC (alumina+TiC). Those skilled in the art will recognize that layers 2-8 represent the read head portion of the recording device while overlying layers represent the write head portion. The substrate is typically part of a slider (not shown) formed in an array of sliders on a wafer. After the combined read/write head is completed, the wafer is sliced to form rows of sliders. Each row is typically lapped to afford an ABS before dicing to fabricate individual sliders that are paired with a suspension in a HGA for a hard disk drive (HDD) application.

The present disclosure anticipates that one or more dynamic fly height (DFH) heater elements (not shown) may be formed in one or more insulation layers in the PMR writer structure to control the extent of thermal expansion (protrusion) at the ABS 30-30 and toward a magnetic medium 140 during a read or write process. Read gap (RG) and write gap (WG) protrusion may be tuned by the placement of the one or more DFH heater elements, and by the choice of metal or alloy selected for the DFH heater elements since each DFH heater resistor material has a particular thermal and mechanical response to a given electrical input. Usually, the RG protrusion/WG protrusion ratio (gamma ratio) is around 1 to provide the best read/write performance and reliability. The DFH heater in the writer is often positioned in one or more of the dielectric layers 38-40 behind interconnect 51 and between bucking coil 60b and driving coil 61b to yield the desired gamma ratio.

A first insulation layer 2 that may be comprised of alumina or another dielectric material is disposed on substrate 1. There is a second insulation layer 3 formed on the first insulation layer and behind the read head layers 4-8. Above layer 2 is the S1 shield 4 that is comprised of NiFe or CoFeNi or the like, and extends from the ABS toward a back end of the read head. A read gap 5 is formed between the S1 (bottom) shield 4 and S2A (top) shield 7. A magnetoresistive element or sensor 6 is formed in the read gap 5 along the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an antiparallel fashion. The non-magnetic layer in the sensor 6 may be an insulator such as MgO in a tunneling magnetoresistive (TMR) sensor.

The top shield 7, insulation layer 8, and return path (RTP) 9 are sequentially formed on the read gap 5. In some embodiments, the RTP serves as the S2B shield in the read head while top shield 7 is the S2A shield. S2A and S2B layers may be made of the same magnetic material as in the S1 shield 4. Insulation layer 8 may be the same dielectric material as in insulation layer 2. Although the RTP is recessed from the ABS and formed within insulation layer 10, the RTP may serve as a flux return pathway in the writer by magnetically connecting a recessed S2 connector (S2C) 32 with back gap connection (BGC) 52 in leading loop pathway 70a that includes leading shield 13, leading shield connector (LSC) 33, the S2C, the RTP, and the BGC. The exemplary embodiment features a recessed dual write shield (rDWS) BGC base writer structure.

A bottom portion 52a of BGC 52 contacts a top surface of RTP 9, and a top surface of the BGC upper portion 52b contacts a back portion of the bottom surface of main pole (MP) 14. In the exemplary embodiment, there is a first insulation layer 37 formed on the RTP and adjoining the sides of S2C 32, and contacting the sides of a bottom portion of the BGC. A second insulation layer 38 is formed on the first insulation layer and behind LSC 33. Here, the bucking coil has a one turn design with a front portion 60a, a center portion 60c contacting the center tap (interconnect) 51, and a back portion (lead) 60b that are completely displayed in the top-down view in FIG. 9B. The bucking coil is wound in series with an opposite current flow direction to that in the driving coil (front portion 61a, center portion 61c on the center tap, and a back portion 61b with a top-down view in FIG. 9A) to drive the MP magnetic direction while minimizing the driving force in write shield (WS) 18 and PP3 TS 26. FIG. 4 represents a down-track cross-sectional view taken along plane 41-41 in FIG. 9A-9B or in FIG. 10.

In FIG. 4, a third insulation layer 39 is formed on insulation layer 38 behind leading shield 11 and contains tapered bottom yoke (tBY) 35. Generally, insulation layers 37-39 have a combined thickness essentially equal to that of BGC 52. LSC 33, S2C 32, BGC 52, and RTP 9 may be made of NiFe, CoFe, CoFeNi or the like with a saturation magnetization (Ms) value of 10 kiloGauss (kG) to 16 kG. Above the BY is MP 14 (with pole tip 14p at ABS 30-30) that may be comprised of NiFe, CoFe, CoFeNi, or CoFeN, and is preferably a 19 kG or 24 kG material. The MP has a back portion that connects with a top surface of BGC 52 to complete the leading loop. Leading shield (LS) 11 is separated from the MP by lead gap 13. Flux 70 from the MP enters magnetic medium 140 during a write process and returns in part as flux 70a though the leading loop comprised of LS 11, LSC 33, S2C 32, RTP 9, and the BGC.

A first trailing shield (TS) layer 17 also known as the hot seed layer, and typically made of a 19-24 kG material, has a bottom surface formed on a write gap (not shown) at the ABS and extends a throat height distance away from the ABS 30-30 to an ABS facing (front) side of non-magnetic layer 21. A second TS layer (WS) 18 also extends from the ABS to non-magnetic layer 21, and like the first TS layer, may be made of CoFeN, CoFeNi, NiFe, or CoFe and is part of the trailing loop. The trailing loop for flux 70b to return to MP 14 further includes an uppermost (PP3) trailing shield 26 that arches over driving coil (DC) front portion 61a to connect with TY 36 above the MP back portion. WS 18, TY 36 and the PP3 TS are typically made of materials with a Ms of 16 kG to 19 kG.

Insulation layer 25 is formed on insulation layer 22 and fills the openings between the DC front portion 61a and PP3 TS 26, and also covers DC portions 61b, 61c. Protection layer 27 covers the PP3 TS and is made of an insulating material such as alumina. Above the protection layer and recessed a certain distance from the ABS 30-30 is an optional cover layer 29 that is preferably comprised of a low CTE material such as SiC that serves to reduce the WG protrusion rate. The SiC cover layer is recessed to height u to avoid introducing a material at the ABS with different mechanical and etch resistance properties than adjacent layers that could adversely affect back end lapping and ion beam etching processes. Overcoat layer 28 is formed as the uppermost layer in the write head.

The dual flux return pathway in the rDWS BGC and DWS BGC designs described hereinafter is employed to reduce sidetrack erasure (STE). Typically, about 50% of flux returns from magnetic medium 140 through leading loop 70a and about 50% through trailing loop 70b in the aforementioned designs.

Figure 5A:
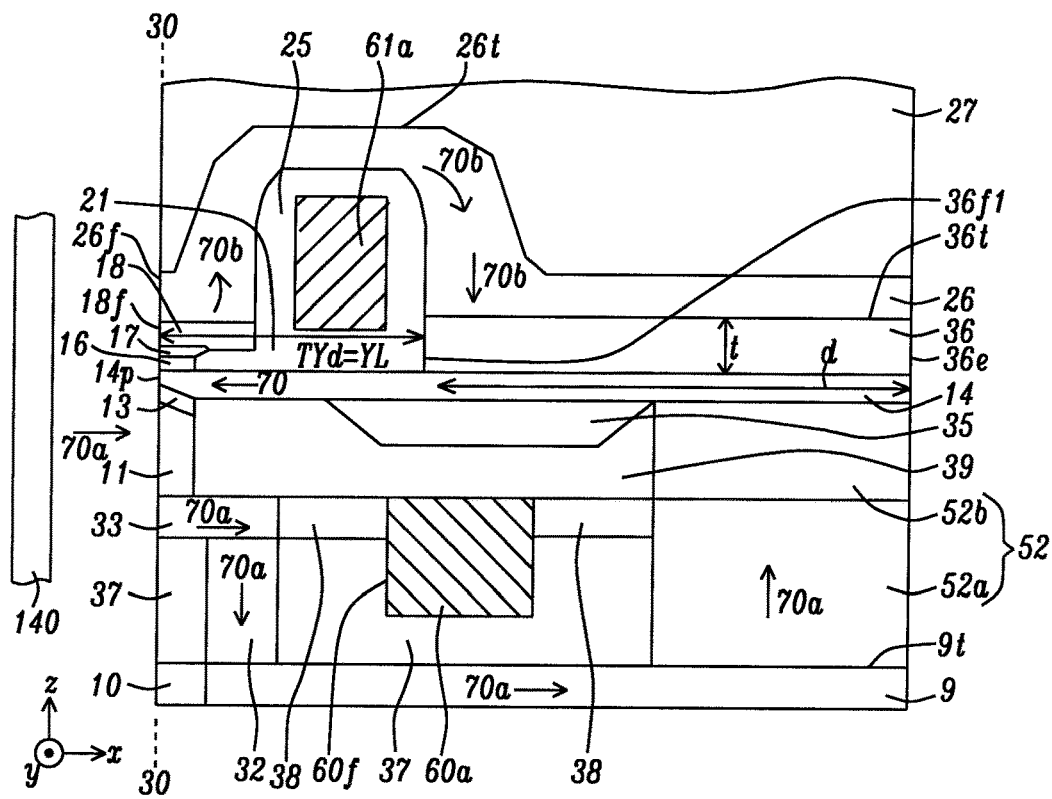
FIG. 5A is a down-track cross-sectional view that is an enlargement of the write head portion in FIG. 4 and shows the trailing (top) and leading (bottom) loops for magnetic flux return to the MP in a recessed DWS (rDWS) BGC base writer design.

Referring to FIG. 5A, a front portion of the rDWS BGC writer structure in FIG. 4 is enlarged to more clearly depict the leading loop 70a and trailing loop 70b for magnetic flux return to MP 14. In this embodiment, PP3 TS 26 has an arched top surface 26t rather than a flat top surface in FIG. 4. TY 36 has thickness t and extends a height d from front surface 36f1 to backside 36e, and has a height TYd from ABS 30-30 to the TY front surface. The TY top surface 36t adjoins a bottom surface of the PP3 TS behind DC front portion 61a. Bucking coil (BC) front portion 60a has a front surface 60f below tBY 35.

Figure 5B:
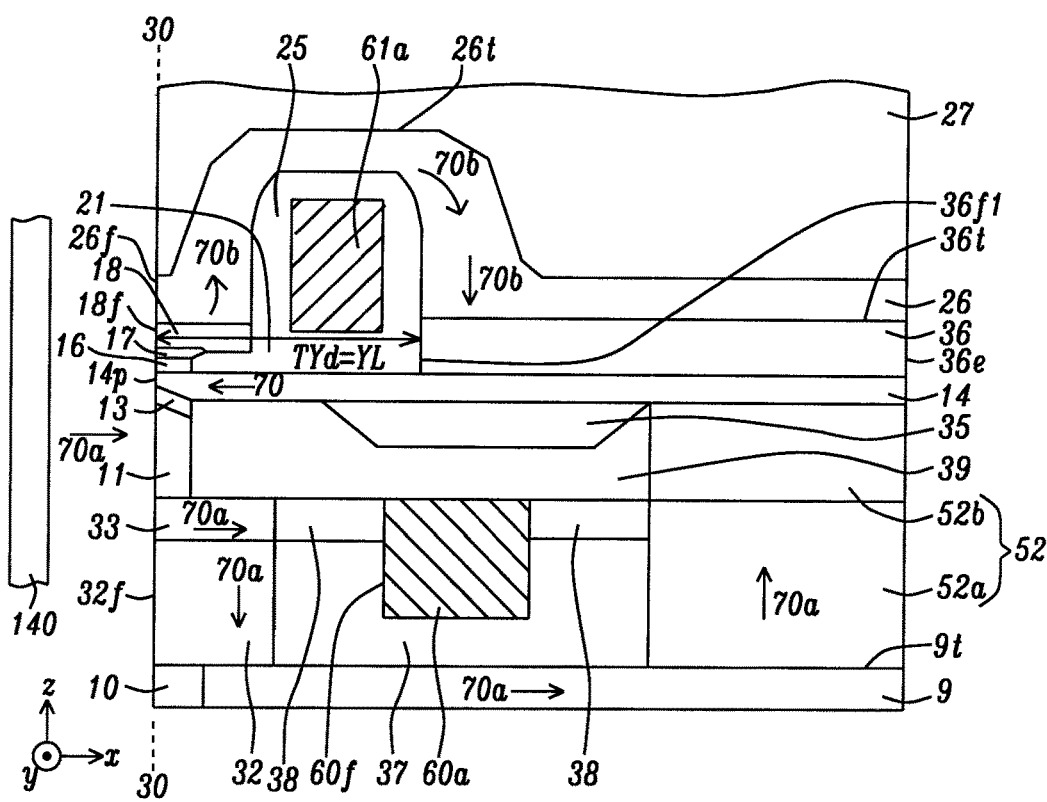
FIG. 5B is a down-track cross-sectional view showing a DWS BGC base writer design according to an embodiment of the present disclosure.

In FIG. 5B, another base writer structure known as DWS BGC according to another embodiment of the present disclosure is illustrated. The DWS BGC design represents a modification of the previous embodiment in FIG. 5A. In particular, leading shield connector 33 and a front portion of insulation layer 37 at the ABS are replaced with an enlarged S2C 32 such that S2C front side 32f is at the ABS 30-30.

Effectively, the leading shield is extended downward so that magnetic flux 70a may enter both of leading shield 11 and the S2C at the ABS.

Figure 5C:
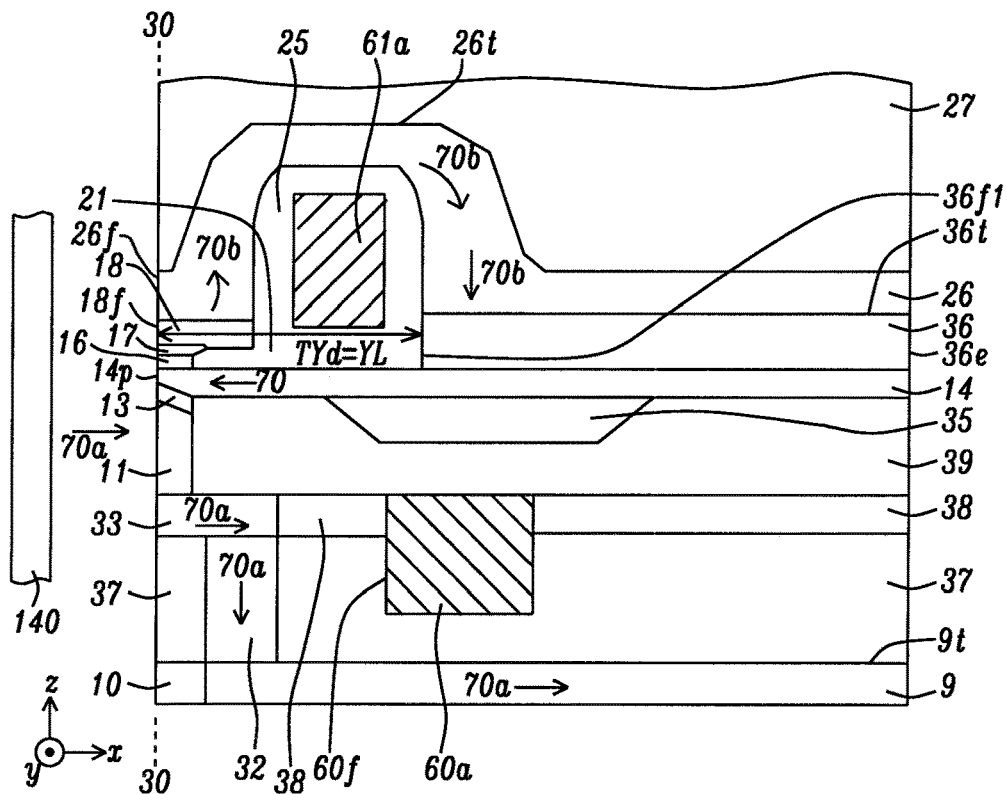
FIG. 5C is a down-track cross-sectional view depicting a rDWS no BGC base writer design according to an embodiment of the present disclosure where the BGC in FIG. 5A has been removed.

Referring to FIG. 5C, another embodiment according to the present disclosure is shown that is a rDWS no BGC base writer wherein the rDWS BGC design described previously is modified to replace BGC 52 with dielectric layers 37-39. Thus, the leading loop extends from LS 11 at ABS 30-30 to RTP 9 but there is no BGC or magnetic path to enable magnetic flux 70a to reach MP 14. This embodiment has the same advantage as the nDWS base structure in the following embodiment in terms of a better return field 70b at the MP trailing edge and through the trailing loop than the rDWS BGC and DWS BGC designs.

Figure 5D:
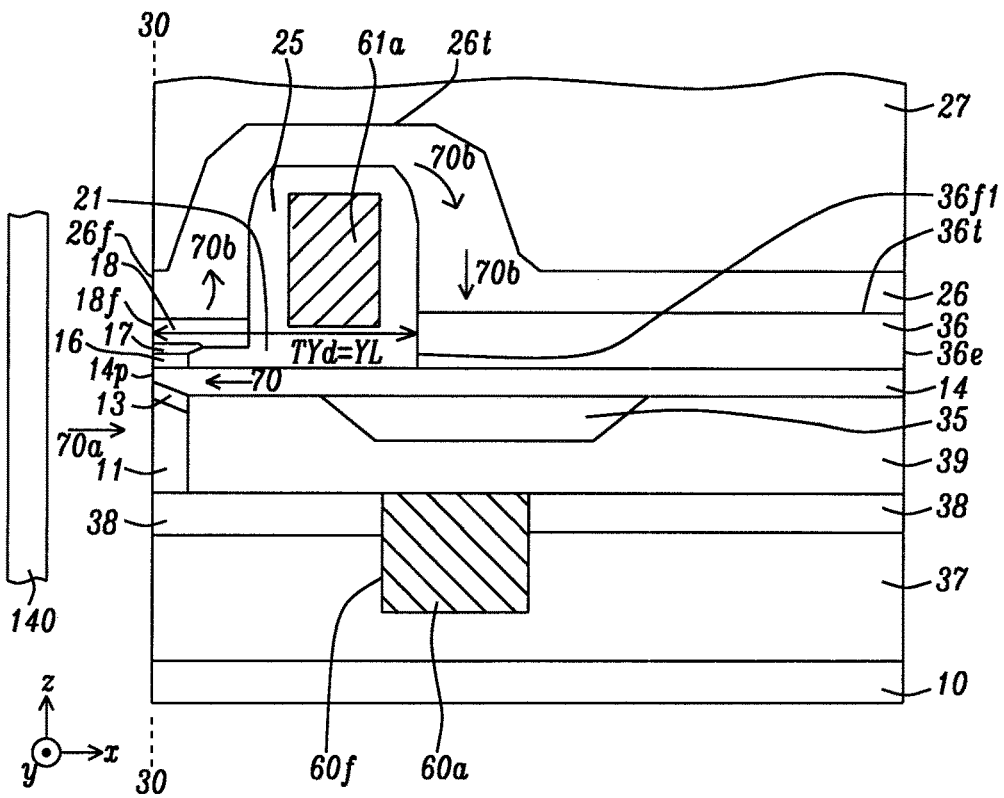
FIG. 5D is a down-track cross-sectional view where only the leading shield in the leading loop in FIG. 5A remains to give an nDWS base writer structure.

In FIG. 5D, a fourth base writer structure according to the present disclosure is illustrated and is a nDWS design where the leading loop for flux return 70a terminates at LS 11 since the LSC 33, S2C 32, RTP 9, and BGC 52 found in one or more other embodiments are omitted. In the exemplary embodiment, dielectric layer 10 replaces the RTP, dielectric layer 37 replaces the S2C, and dielectric layer 38 replaces the LSC.

Figure 6:
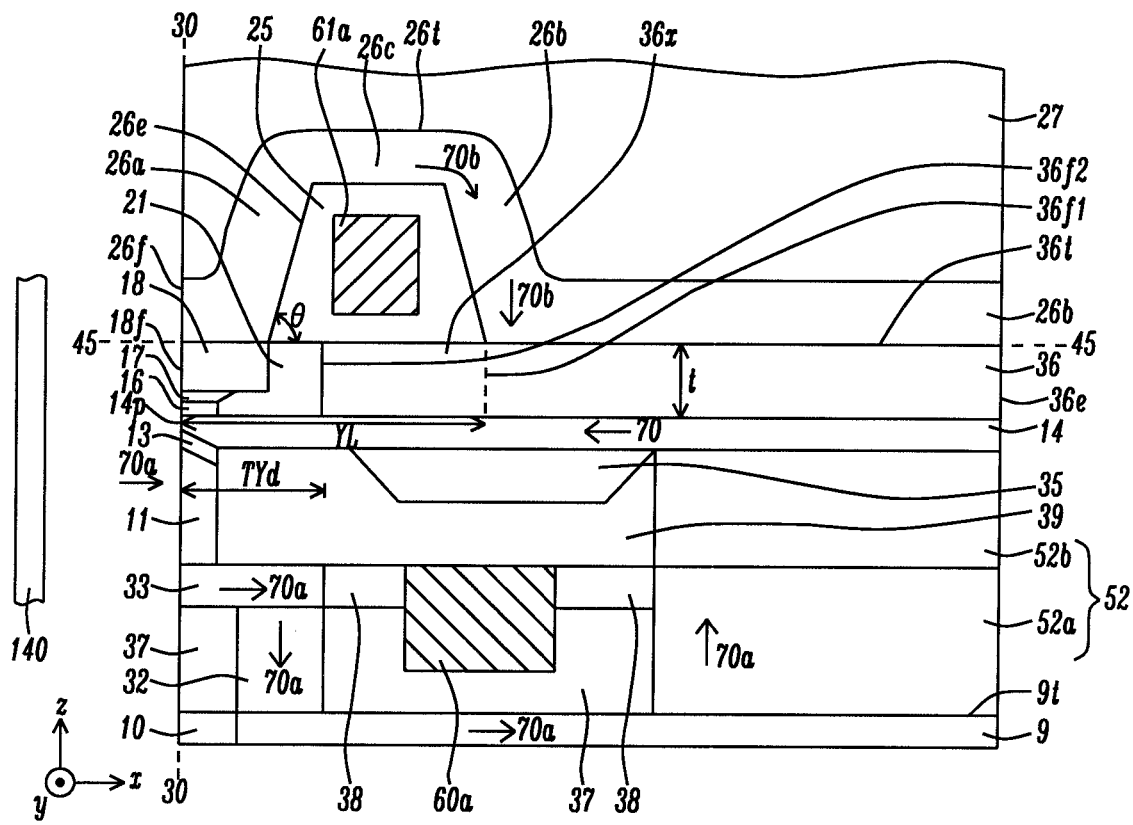
FIG. 6 is a down-track cross-sectional view showing a modification of the PMR writer in FIG. 5A where the top yoke has an ultimate double yoke (uDY) design according to an embodiment of the present disclosure.

FIG. 6 depicts another embodiment of the present disclosure wherein the rDWS BGC writer in FIG. 5A is modified to have a uDY scheme in which the top yoke (identified as 36/36x) has an extension TY 36x with front side 36/2, and a backend that adjoins the front side 36/1 of TY 36, and has thickness t from 0.3-0.8 micron. Front side 36/1 is at height YL of 2-2.6 microns from ABS 30-30. A key feature is that the front side 36/2 has height TYd substantially less than YL used in prior art top yokes. With the TY extension, faster saturation speed that allows a lower lw-peak (0 to peak current) also known as a lower lw0-pk pick at outer diameter (OD) operation has been demonstrated. PP3 TS 26a-26c comprises PP3 TS front portion 26a extending from a front side 26f at the ABS to PP3 TS center portion 26c that arches over DC front portion 61a, and a PP3 TS back portion 26b behind the DC front portion and contacting the TY top surface 36t at plane 45-45. The PP3 TS front portion has a backside 26e that forms an angle 9 from 60 degrees to 80 degrees with plane 45-45. PP3 TS apex angle 9 is believed to enhance flux concentration at WS 18 and provides improved high data rate performance. The DC front portion is above plane 45-45 and TY extension 36x, and within insulation layer 25.

Figure 7A:
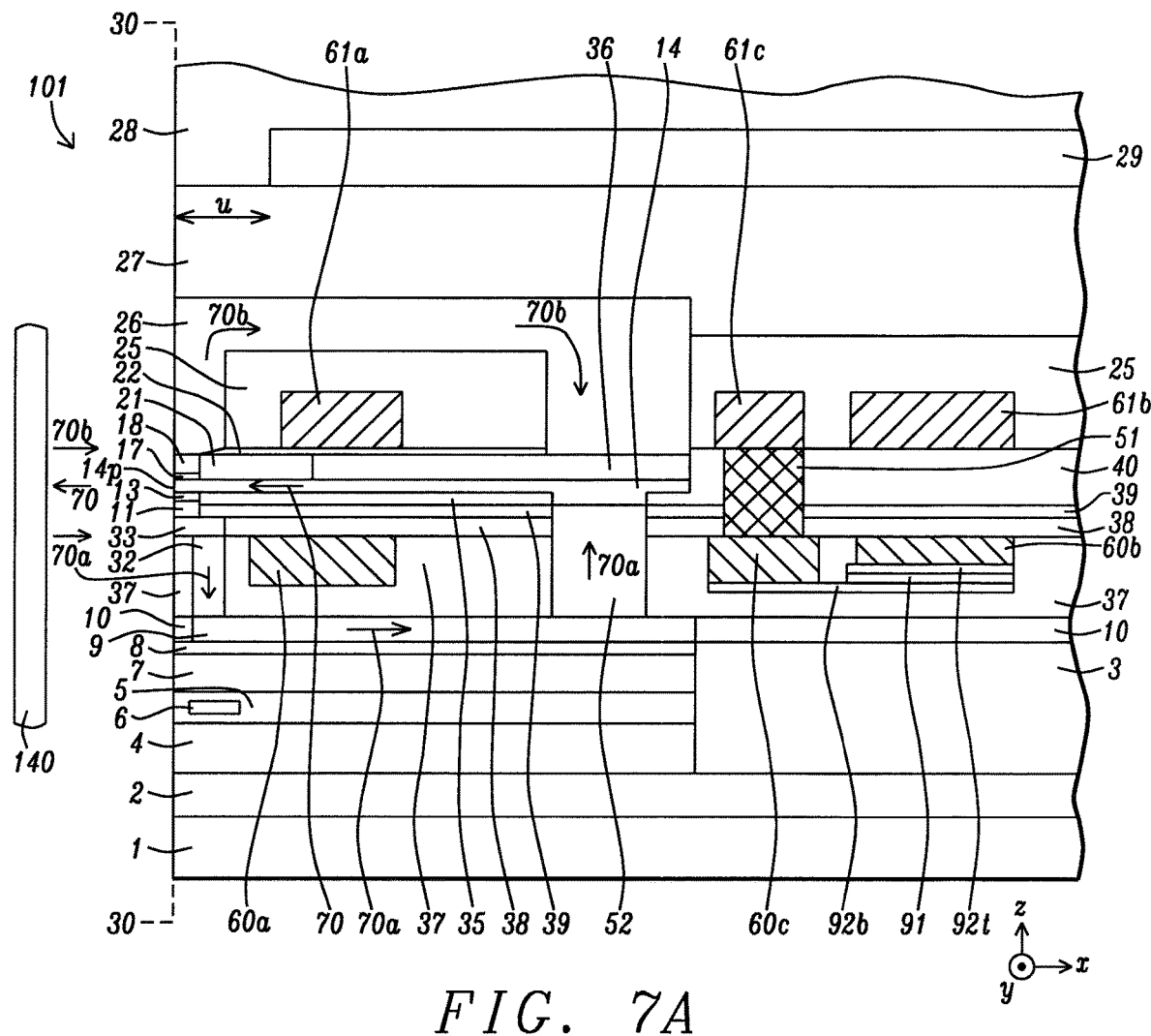
FIG. 7A is down-track cross-sectional view of an embodiment of the present disclosure where C1T capacitor is formed below a back portion of the bucking coil, and is sandwiched between a bottom electrode (BE) and top electrode (TE).

A key feature of the so-called C1T writer of the present disclosure is the application of a C1T capacitor (C_bot) across the bottom coil in any of the base writer designs described with respect to FIGS. 5A-5D. Furthermore, any of the base writer designs may comprise a uDY 36/36x as shown in the rDWS BGC embodiment in FIG. 6 to improve performance. Accordingly, FIG. 7A illustrates an embodiment of the present disclosure where a C_bot 91 is formed within insulation layer 37 and below BC portions 60b, 60c in the rDWS BGC with a uDY design. In particular, the C_bot is formed between a bottom electrode (BE) 92b and a top electrode (TE) 92t to form a TE/C1T capacitor/BE stack below BC back portion (lead) 60b, and where a BE front portion extends below BC center portion 60c and contacts the BC center portion while the TE adjoins a bottom surface of BC lead 60b. The BE and TE may be comprised of one or more layers of Cu, Ta, W, Ru, or Au, and have a thickness from 50 nm to 200 nm.

The C1T capacitor 91 preferably has a dielectric constant greater than 10, and has a capacitance proximate to 50 pF when comprised of TaOx with a thickness ≤75 nm, and an area ≥0.0155 mm² from a top-down view. In some embodiments, the C1T capacitor is made of TaOx, TiOx, or TiO₂ with a dielectric constant of 10-20, 20-50, and 110, respectively. For example, using a dielectric layer made of TiOx or TiO₂, and with proper thickness and area adjustment, a capacitance of 0.1-0.5 nF is achievable. The C1T capacitor, BE 92b, and TE 92t top-down shapes may vary so that the BE and TE make the desired contact with BC center portion 60c and BC lead 60b (or a pad on the BC lead), respectively, and in order for the C1T capacitor to provide the desired capacitance.

Figure 7B:
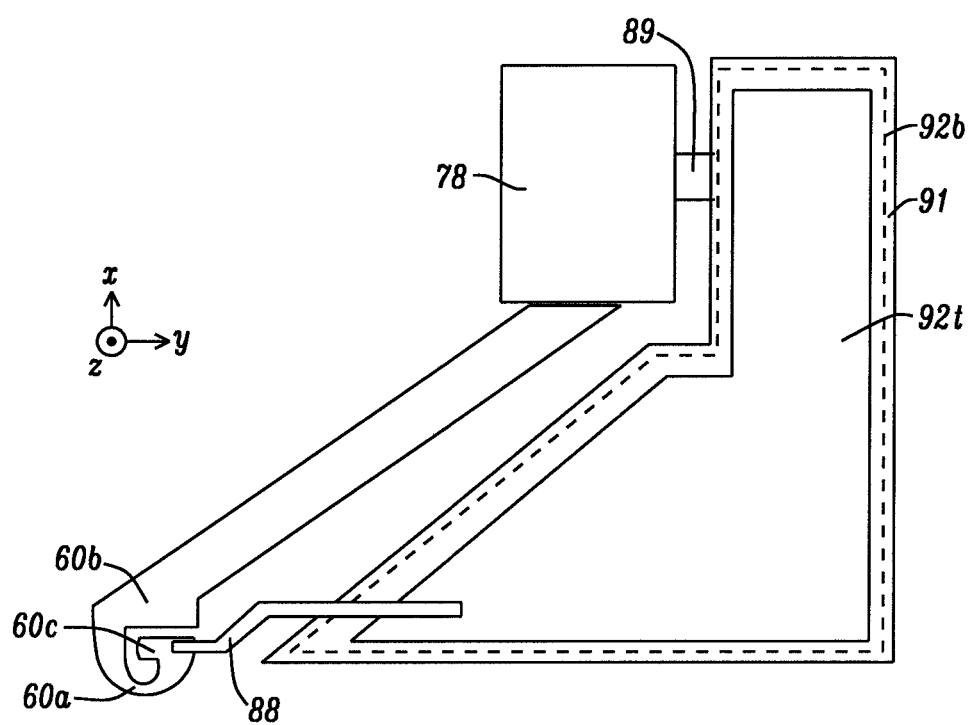
FIG. 7B is a top-down view of another embodiment of the present disclosure where there is no overlap between a C1T capacitor and bottom coil (BC), but where there is a first lead connecting the BC to the TE, and a second lead connecting the BE to a BC pad.

Referring to FIG. 7B, an alternative embodiment of the C1T writer of the present disclosure is shown from a top-down view since there is no overlap of the BE/C1T capacitor/TE with the bucking coil that would enable one to depict all of the aforementioned components in a down-track cross-sectional view. In this case, the TE/C1T capacitor/BE stack is offset from the BC in the cross-track direction. In particular, a first lead 88 is employed to electrically connect TE 92t with BC center portion 60c, and a second lead 89 is used to electrically connect BE 92b with BC pad 78 that adjoins BC lead 60b. In the exemplary embodiment, an irregular shape is shown for the TE/C1T capacitor/BE stack, but other shapes may be employed in alternative embodiments. An important feature is that the TE has a smaller surface area than the C1T capacitor, which fully covers the BE.

Figure 8A:
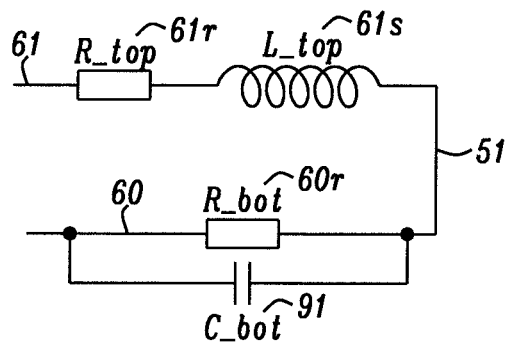
FIGS. 8A-8B are conceptual equivalent circuits in a C1T design with a capacitor (C_bot) applied across the bottom coil, and where the top coil has a resistive load and an inductive load in series, and the bottom coil has a resistive load only (FIG. 8A) or a resistive load and an inductive load in series (FIG. 8B).
Figure 8B:
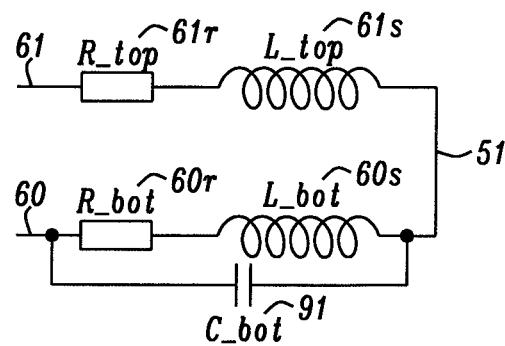

Two conceptual equivalent circuits of a C1T design with a C_bot 91 applied across the bottom coil are shown in FIGS. 8A-8B. For both cases, the DC 61 is represented by resistive load (R_top) 61r and inductive load (L_top) 61s that are arranged in series. In FIG. 8A, BC 60 is represented with a resistive load (R_bot) 60r only, and in FIG. 8B, the BC has a resistive load 60r and inductive load (L_bot) 60s in series. Generally, either the DC or BC in a 1+1T writer may be represented as R_top and L_top in series, or R_bot and L_bot in series, respectively, as in FIG. 8B. The BC usually has lower inductance, especially in nDWS and rDWS no BGC embodiments. When BC inductance is negligible, the equivalent circuit may be simplified to FIG. 8A.

Figure 9A:
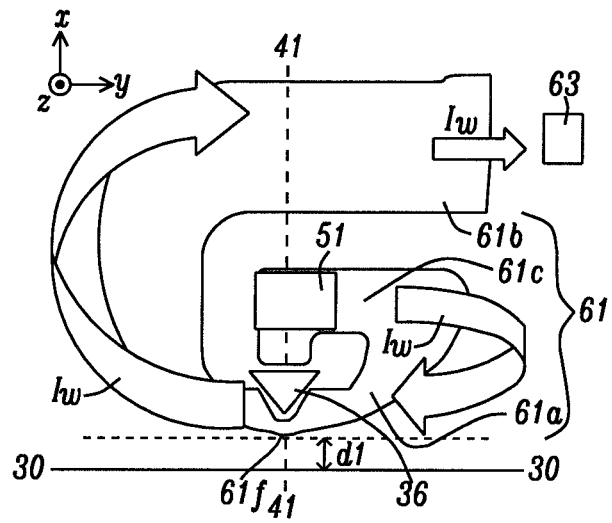
FIGS. 9A-9B are top-down views of a write current (Iw) flow in a C1T writer according to an embodiment of the present disclosure where Iw flows clockwise in the driving coil (FIG. 9A) and counterclockwise in the bucking coil (FIG. 9B).
Figure 9B:
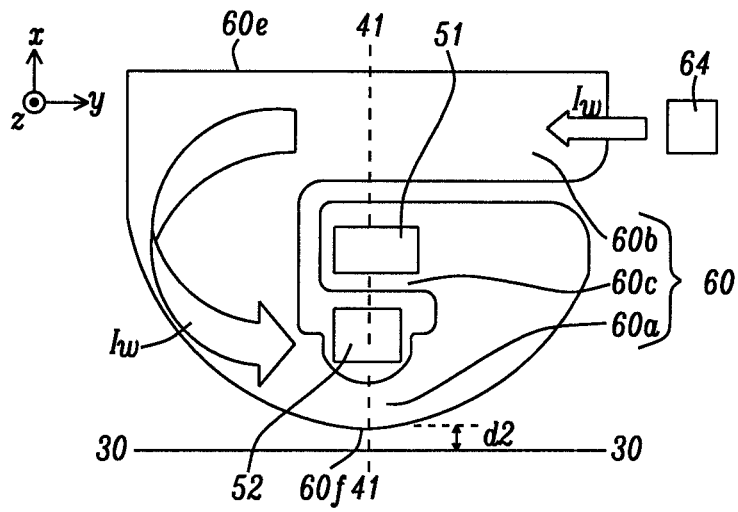
Figure 10:
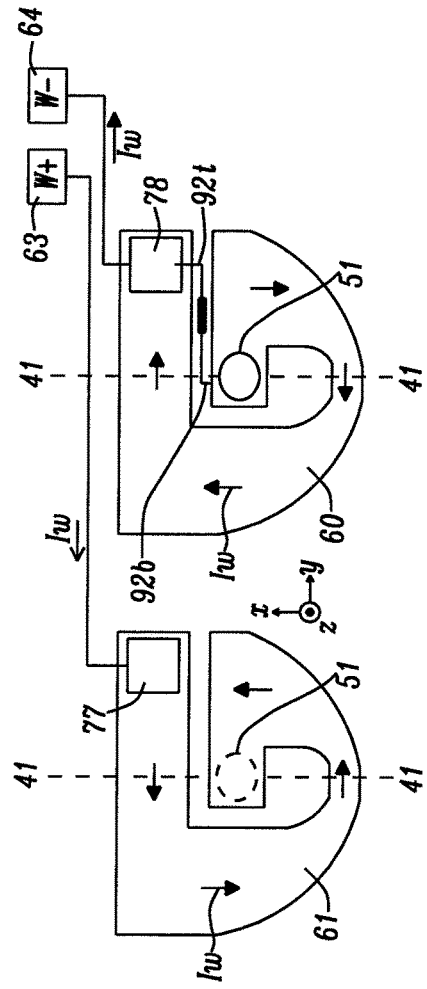
FIG. 10 shows a wiring scheme in a C1T writer according to an embodiment of the present disclosure where Iw flows counterclockwise in the driving coil and clockwise in the bucking coil, and a C1T capacitor is applied between the interconnect and the pad on the bucking coil.

Referring to FIGS. 9A-9B, the 1+1T writer design is depicted in a top-down view to more clearly show the path of write current lw in DC 61 (FIG. 9A) and in BC 60 (FIG. 9B). Center plane 41-41 bisects the MP (not shown) but note the MP is formed below TY 36 in FIG. 9A and above BGC 52 in FIG. 9B. In FIG. 9A, DC front portion 61a has a front side 61f recessed to height d1 from ABS 30-30, and in FIG. 9B, BC front portion 60a has front side 60f recessed to height d2 from the ABS. According to one embodiment, lw flows from writer pad 64 to BC lead 60b and counterclockwise through the BC to BC center portion 60c and interconnect 51 as in FIG. 9B. Then, in FIG. 9A, lw exits the interconnect and flows clockwise from DC center portion 61c through the DC to DC back portion (lead) 61b and then to writer pad 63 thereby generating magnetic flux in the MP for a write process.

As mentioned previously, the C1T capacitor (not shown) may alternatively be formed in the read head and within insulation layer 2 in FIG. 4. However, this design requires additional wiring (via) connections to interconnect 51 and the BC lead 60b in the write head. Preferably, the C1T capacitor 91 is formed in a writer as described earlier with regard to FIG. 7A or FIG. 7B, or in another base writer design with or without a uDY scheme. According to one embodiment shown in FIG. 10, the C1T capacitor (not shown) is between BE 92b and TE 92t where the BE contacts BC 60 below center tap (interconnect 51) and the TE contacts the coil pad 78 on BC lead 60b. It should be understood that write current lw may flow in the opposite direction than shown in FIGS. 9A-9B. In this case, lw flows from W+ pad 63 to pad 77 on DC lead 61b and then counterclockwise through the DC to DC center portion 61c and interconnect 51. After exiting interconnect 51, lw proceeds clockwise from BC center portion 60c through the BC to BC lead 60b and then to pad 78 before flowing to W− pad 64. In the exemplary embodiment, the DC and BC have a pancake shape, but in other embodiments may have a helical shape as described in related U.S. Pat. No. 10,777,220.

Figure 11A:
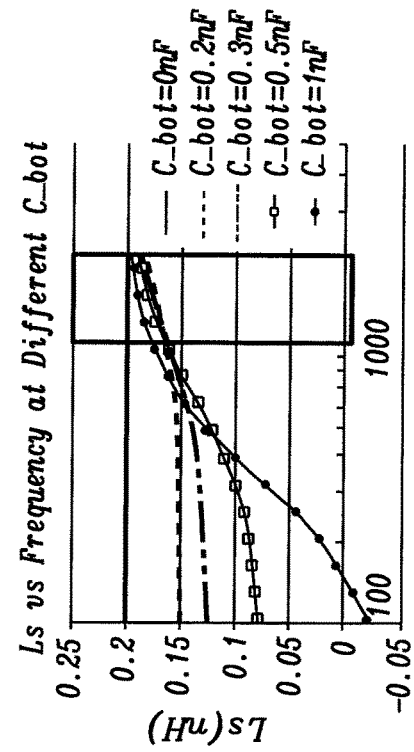
FIGS. 11A-11D show modeling results of a C1T design with the equivalent circuit in FIG. 8A where R_top=1 ohm, R_bot=0.5 ohm, L_top=0.2 nanoHenry (nH), and C_bot is varied between 0 nF and 1 nF.
Figure 11B:
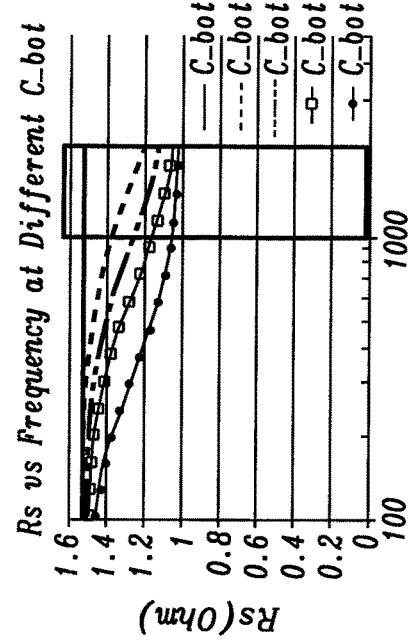
Figure 11C:
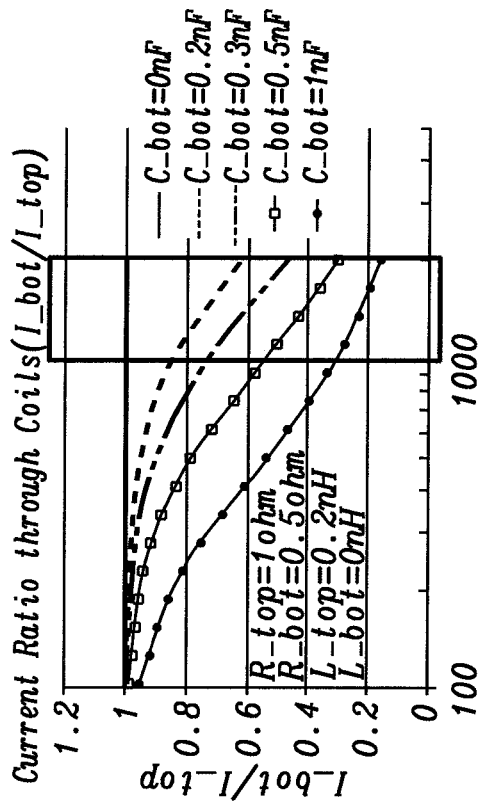
Figure 11D:
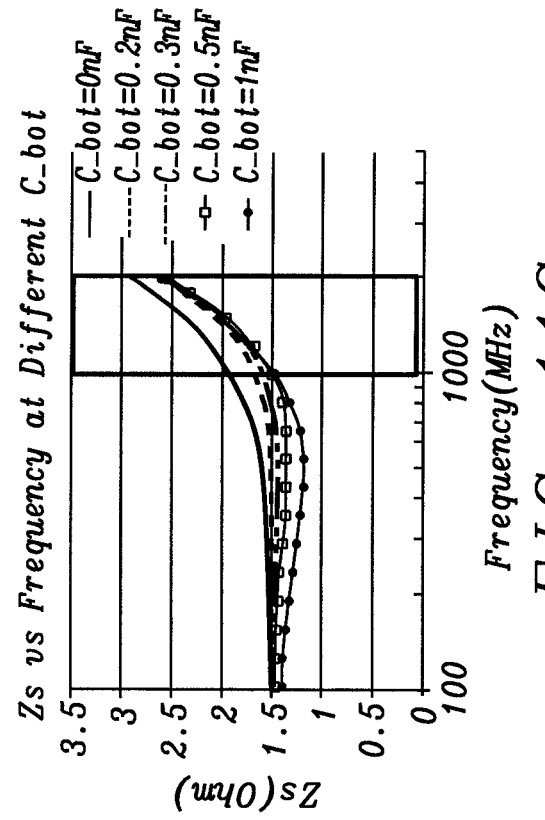
Figure 12A:
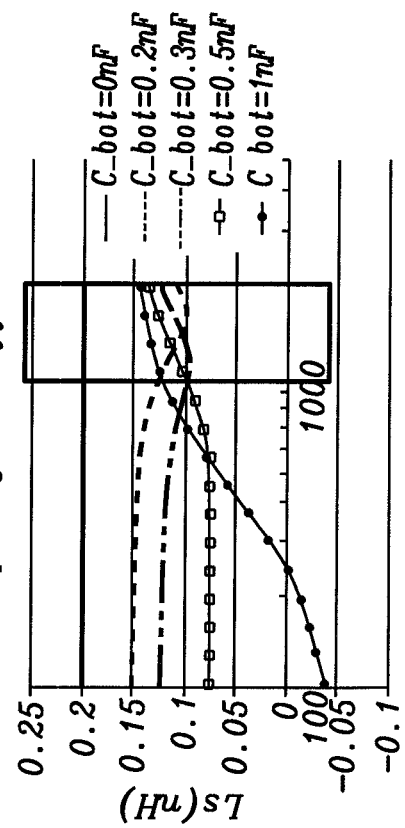
FIGS. 12A-12D show modeling results of a C1T design with the equivalent circuit in FIG. 8B where R_top=1 ohm, R_bot=0.5 ohm, L_top=0.15 nH, L_bot=0.05 nH, and C_bot is varied between 0 nF and 1 nF.
Figure 12B:
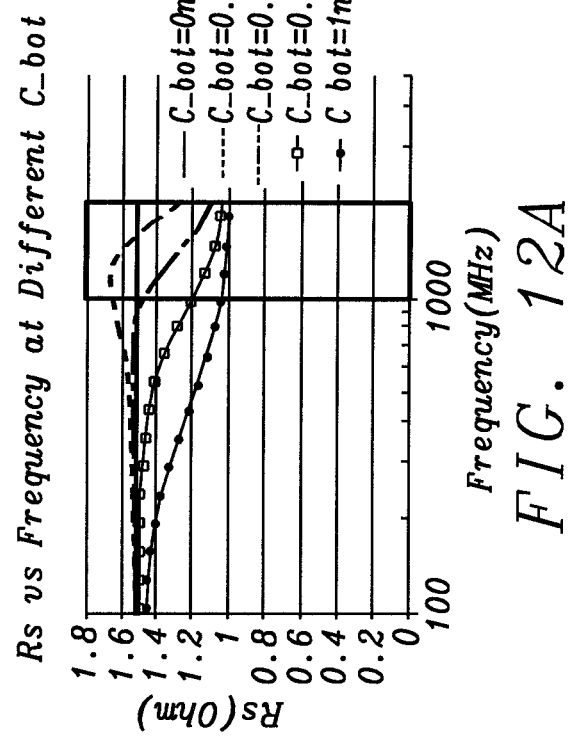
Figure 12C:
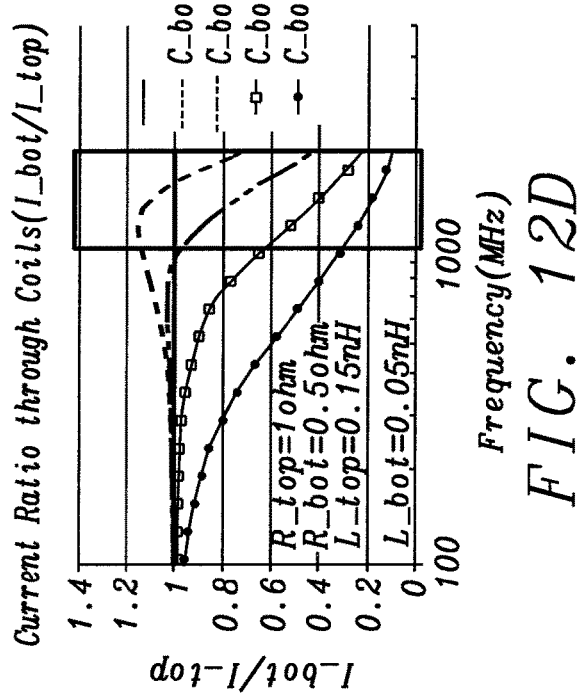
Figure 12D:
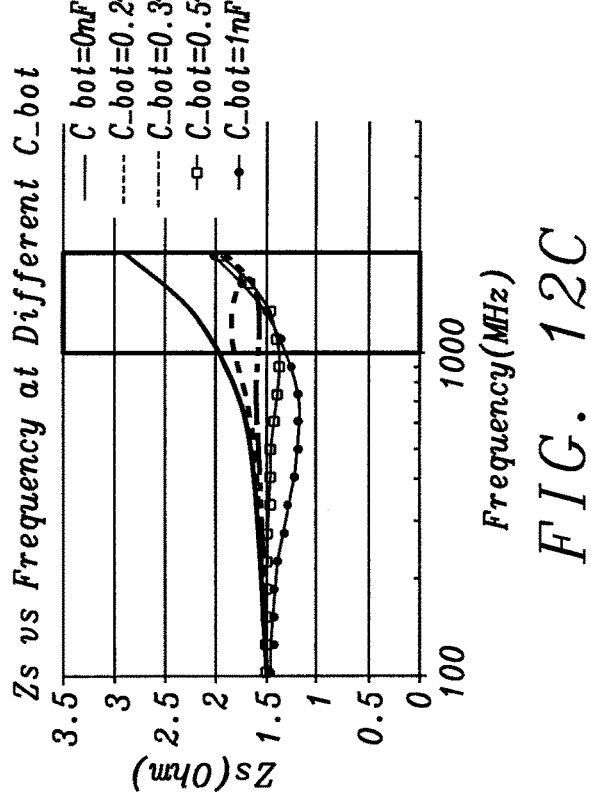
Figure 13B:
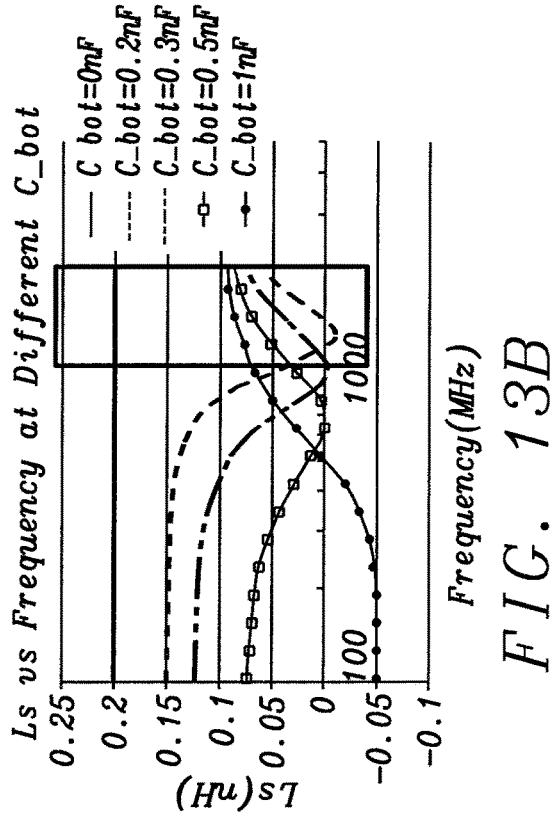
Figure 13A:
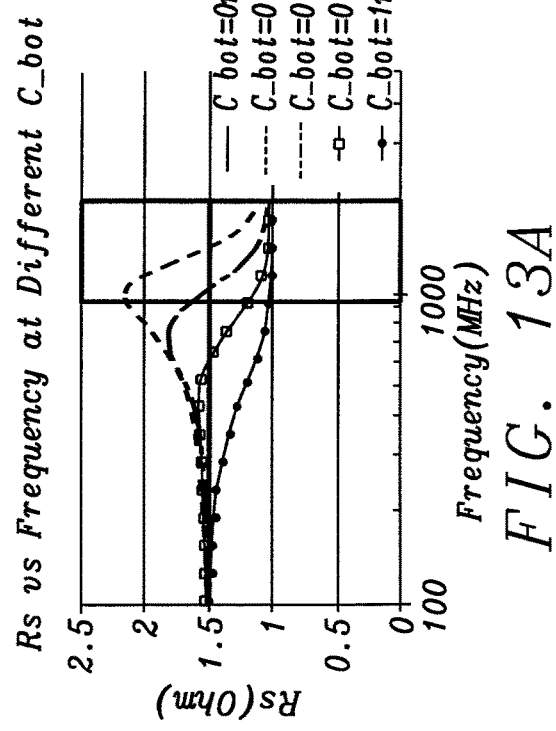

A typical 1+1T write head has a total direct current resistance (DCR) of about 1 ohm to 1.5 ohm and total inductance of approximately 0.2 nanoHenry (nH). We performed a modeling study to determine an optimum C1T capacitor design for embodiments represented by the equivalent circuits in FIGS. 8A-8B. Since the bottom coil is usually wider and thicker than the top coil, and has lower resistance compared with the top coil, a model based on FIG. 8A is set up with R_top=1 ohm, R_bot=0.5 ohm, and L_top=0.2 nH. As shown in FIGS. 11A-11D, C_bot capacitance is assigned five different values of 0, 0.2, 0.3, 0.5, and 1 nF. FIG. 11A shows a plot of equivalent series resistance (Rs) vs. frequency while FIG. 11B, FIG. 11C, and FIG. 11D are plots of equivalent series inductance (Ls), equivalent series impedance (Zs), and current ratio through the bottom coil and top coil (I_bot/I_top), respectively, as a function of frequencies in the range of 100 MHz to 2 GHz in the applied write current. As the capacitance for C_bot is increased and the bottom coil is shunted more, Rs decreases and approaches R_top=1 ohm at higher frequency, and I_bot/I_top approaches 0 faster at higher frequency.

FIGS. 12A-12D show results from a modeling study based on the FIG. 8B equivalent circuit with parameters proximate to actual operating conditions where R_top=1 ohm, R_bot=0.5 ohm, L_top=0.15 nH, and L_bot=0.05 nH. Again, C_bot capacitance is assigned values of 0, 0.2, 0.3, 0.5, and 1 nF, and plots of Rs, Ls, Zs, and I_bot/I_top vs. frequency are generated. In this case, with an I_bot that is one third that of I_top, a C_bot capacitance ≥0.3 nF is required to deliver the desired output of Rs lower than R_top+R_bot=1.5 ohm, and I_bot/I_top less than 1 at frequencies larger than 1 GHz.

FIGS. 13A-13D illustrate results from modeling of an extreme case of the FIG. 8B equivalent circuit where R_top=1 ohm, R_bot=0.5 ohm, and L_top=L_bot=0.1 nH. C_bot capacitance is assigned values of 0, 0.2, 0.3, 0.5, and 1 nF, and plots of Rs, Ls, Zs, and I_bot/I_top vs. lw frequency in the range of 100 MHz to 2 GHz are generated. With L_bot=0.1 nH, a C_bot capacitance of around 0.3 nF is able to marginally make Rs lower than R_top+R_bot=1.5 ohm, and provide an I_bot/I_top ratio less than 1 at frequencies greater than 1 GHz (1+0.xT). Thus, above 1 GHz, the bottom coil is shunted and provides essentially no power. However, Rs is higher than R_top+R_bot=1.5 ohm and I_bot/I_top ratio is >1 at frequencies below 1 GHz. In this case, a C_bot capacitance of around 0.5 nF enables the desired outcomes of Rs to be lower than 1.5 ohm, and I_bot/I_top less than 1 at frequencies above 750 MHz in a 2T regime where MF is 0.5×1.5 GHz base frequency. Thus, between 750 MHz and 1.5 GHz frequencies, the BC provides x0% of the full power generated in a 1+1T mode below 750 MHz where x is between 0 and 10.

In actual applications, write current overshoot is applied at transition to boost the high frequency response of a write head. The di/dt (current change with time) at the overshoot region and corresponding frequency are a plurality of times higher than the base frequency. Therefore, C1T capacitance of 0.1-0.5 nF is considered enough to accomplish essentially zero contribution from the BC in the current overshoot region.

FIGS. 14A-14B show plots of dielectric constant vs. frequency, and capacitance vs. frequency, respectively, for $TiO_2$ and aluminum doped $TiO_2$ (ATO) films with 12 nm and 20 nm thicknesses, and are taken from IEEE Electron Letters 2017 DOI: 10.1109/led.2017.2654513. Applied frequency is up to 2 GHz. Dielectric constant and unit area capacitance tend to drop slightly at high frequency, but impedance of a capacitor is still low at high frequency because impedance is inversely proportional to the applied frequency. Although the dielectric constant is also lower when dielectric film thickness is thinner, the capacitance can still be higher. For a 1 $mm^2$ unit area at 1 GHz, capacitance values of 18 nF, 21 nF, and 27.5 nF are obtained for 20 nm thick $TiO_2$, 12 nm thick $TiO_2$, and 12 nm thick ATO films, respectively. Accordingly, for a capacitor with a unit area of 0.0155 $m^2$ similar to the C1T capacitor in embodiments of the present disclosure, capacitance values of 0.28 nF, 0.32 nF, and 0.43 nF are expected for the 20 nm thick $TiO_2$, 12 nm thick $TiO_2$, and 12 nm thick ATO films, respectively, at 1 GHz.

Figure 15:
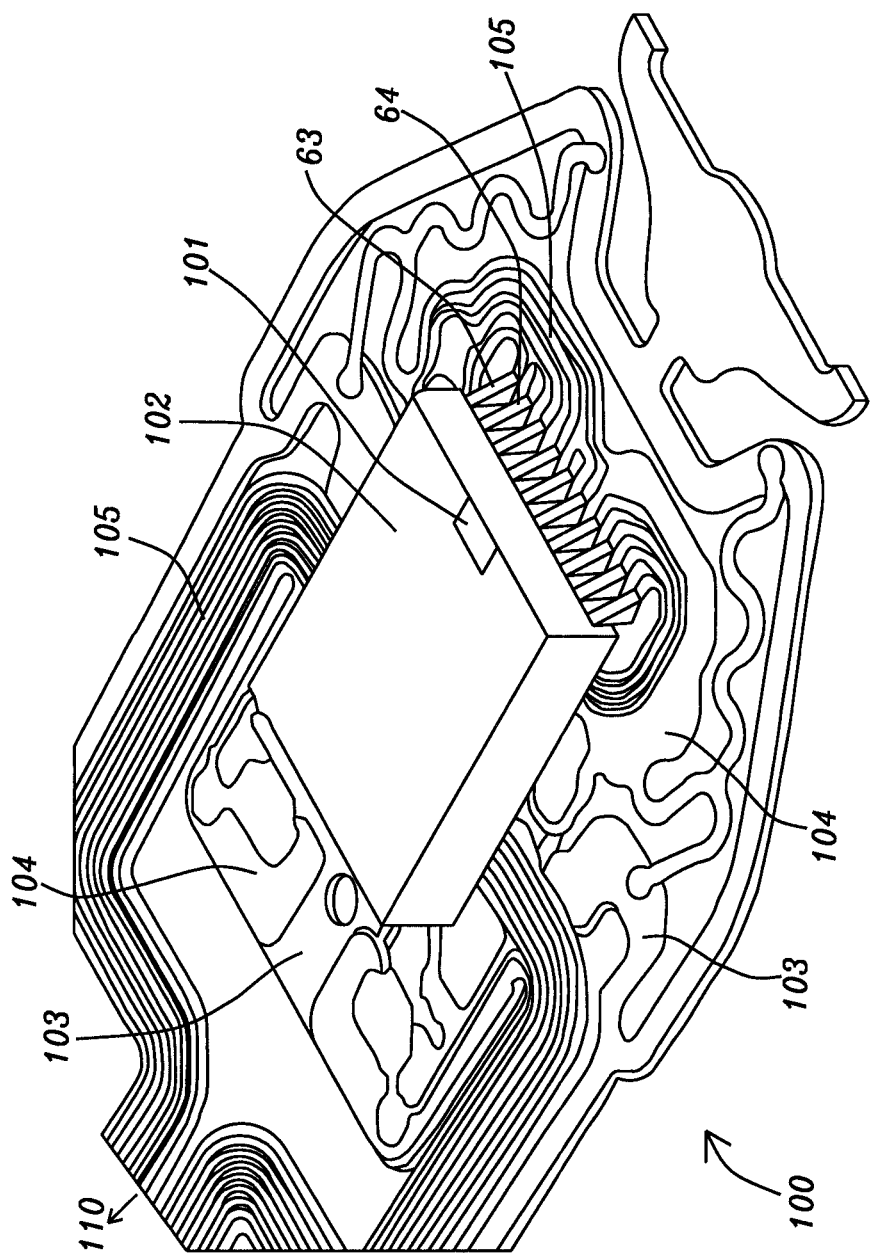
FIG. 15 is an oblique view of a slider on which a combined read/write head structure is mounted, and having adjoining pads and traces (wiring) formed on a suspension according to an embodiment of the present disclosure.

Referring to FIG. 15, HGA 100 is depicted and features suspension 103, an overlying dielectric layer 104, and slider 102 formed thereon. A combined read/write head 101 comprised of a PMR writer of the present disclosure adjoins a top side of the slider facing away from the suspension. The suspension is supported using an actuator arm that is driven by an actuation motor to sweep the suspension and slider across the surface of a recording disk as described previously with regard to FIG. 1. A plurality of pads including writer pads 63, 64 are employed to control a current to the driving coil, DFH heaters, one or more sensors, and one or more readers in the combined read/write head. Connections between the pads and the PMR writer components are within the slider and not visible from this view. The same fabrication scheme used to build a single writer may be employed to fabricate SDW or STW structures of the present disclosure so that no additional product cost is incurred.

Figure 16:
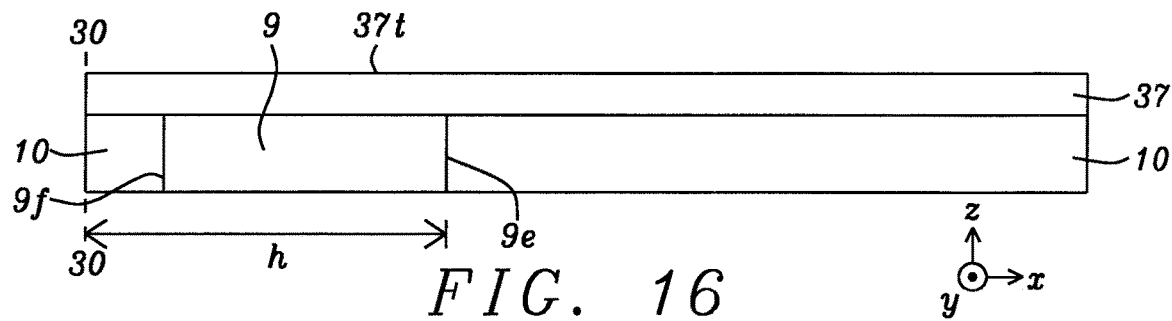
FIGS. 16-19 are down-track cross-sectional views showing a sequence of steps used to form a capacitor below a bottom coil in a C1T writer design according to an embodiment of the present disclosure.

The present disclosure also encompasses a method for forming a C1T capacitor below a bottom coil in a write head, and is illustrated in FIGS. 16-19. Referring to FIG. 16, the process sequence begins by providing a substrate comprised of RTP 9 formed within first insulation layer 10. Plane 30-30 is the eventual ABS location after all layers in the write head are formed and a backend lapping process is performed as appreciated by those skilled in the art. Second insulation layer 37 having top surface 37t is formed on the first insulation layer and RTP. RTP front side 9f is recessed from plane 30-30 while backside 9e is at height h from plane 30-30. All insulation layers in the PMR writer may be comprised of one or more dielectric materials including alumina, silica, and other metal oxides, or metal nitrides used in the art.

Figure 17:
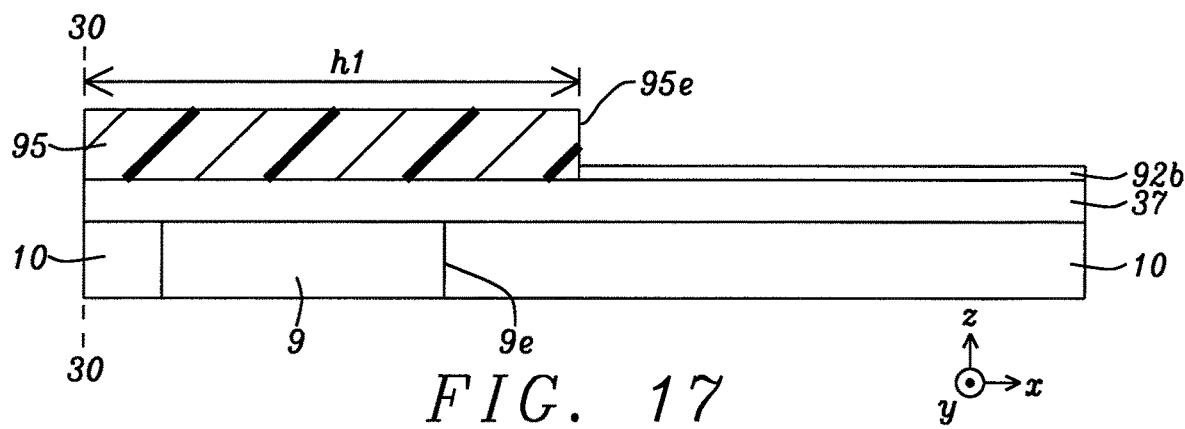

In FIG. 17, a first photoresist mask 95 is formed on second insulation layer 37 with a conventional photolithography process, and extends from plane 30-30 to a backside 95e at height h1 where h1>h. BE 92b is then deposited on exposed regions of second insulation layer top surface.

Figure 18:
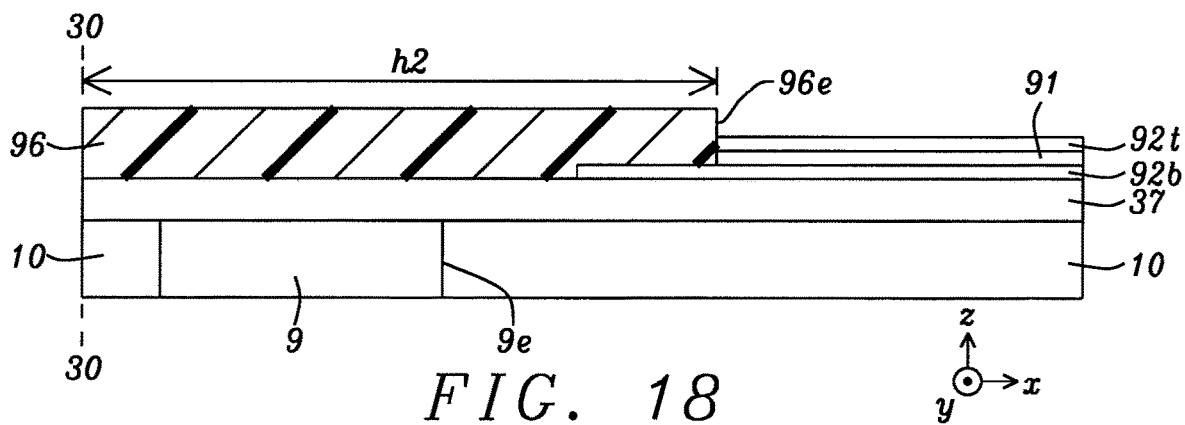

Referring to FIG. 18, the first photoresist mask is removed and a second photoresist mask 96 is formed on the second insulation layer, and extends from plane 30-30 to backside 96e at height h2. Thus, a front portion of BE 92b is protected by the second photoresist mask up to height h2 where h2 is sufficiently greater than h1 to enable interconnect 51 with a desired x-axis dimension to be plated on the BC in a subsequent step between heights h1 and h2. Next, C1T capacitor 91 and TE 92t are sequentially deposited on the exposed regions of BE top surface, and each may have a substantially rectangular shape, for example. Note that both BE and TE shapes in the final design have their own contact lead/pad, and a common effective capacitor region. At the effective capacitor region, BE, TE and the capacitor insulation layer have a similar shape but the capacitor insulation layer is wider than the BE to allow sufficient process margin and to ensure the BE is fully covered. The TE has a smaller surface area than the BE, and fits inside the BE shape from a top-down view (not shown) to minimize TE to BE shunting during wafer processing.

Figure 19:
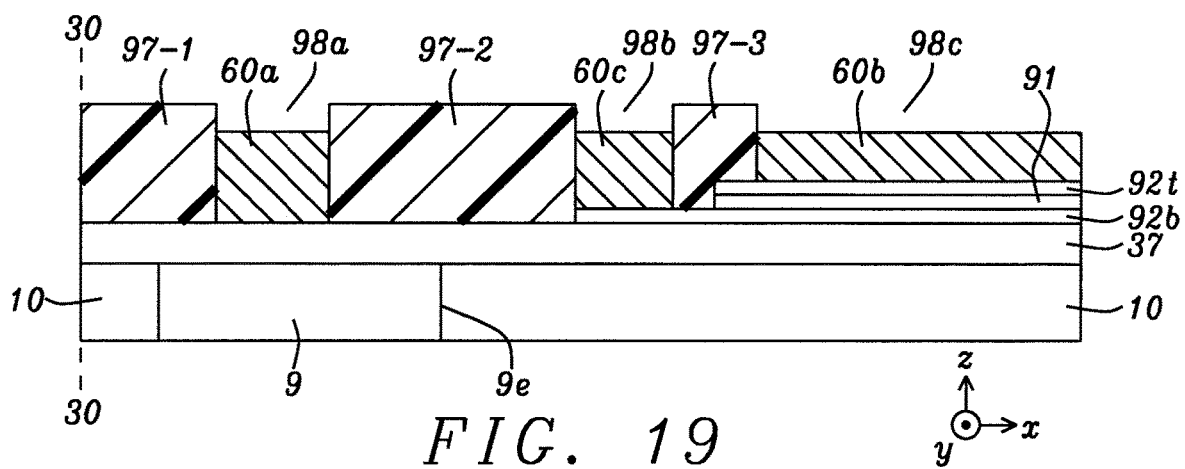

Referring to FIG. 19, the second photoresist mask is removed and a third photoresist (PR) mask is formed on second insulation layer 37, a front portion of BE 92b, and on TE 92t using a well known photolithography technique. The third photoresist mask is comprised of first opening 98a above RTP 9 and between front PR mask portion 97-1 and middle PR mask portion 97-2, second opening 98b between the middle PR mask portion and back PR mask portion 97-3, and a third opening 98c behind the back PR mask portion. Note that the first, second, and third openings will be used to define the shape and size of BC portions 60a, 60c, and 60b, respectively. The first opening uncovers a portion of the second insulation layer while the second opening uncovers the BE front portion between h1 and h2. Meanwhile, the third opening uncovers a back portion of the TE. In the following step, the bucking coil is plated in openings 98a-98c. Accordingly, a BC front portion 60a is formed on the second insulation layer above the RTP, a BC center portion 60c is formed on a BE front portion between h1 and h2, and a BC back portion (lead) 60b is formed on the TE. A CMP process is then used to form a planar top surface (not shown) on BC portions 60a-60c.

Thereafter, a conventional process sequence is employed to form overlying layers in the write head. Typically, the process sequence comprises forming an interconnect 51 on the BC center portion 60c, a top (driving) coil (TC) with one turn and having a center portion 61c that contacts a top surface of the interconnect, and forming a MP 14 between the front BC portion 60a and a front TC portion 61a, and that extends from the ABS 30-30 to a backside at a height less than h1 (front side of BC center portion) as shown in FIG. 4. A lapping process is employed at the backend of the fabrication sequence to form an ABS at plane 30-30.

While the present disclosure has been particularly shown and described with reference to, the preferred embodiments thereof, it will be understood by those skilled in the art that various changes in form and details may be made without departing from the spirit and scope of this disclosure.

I claim:

1. A perpendicular magnetic recording (PMR) writer configured in a capacitive one turn (C1T) design; comprising:
   (a) a main pole that has a main pole tip at an air bearing surface (ABS);
   (b) a top coil with one turn above the main pole;
   (c) a bottom coil with one turn below the main pole and electrically connected to the top coil through an interconnect behind the main pole so that when a write current flows from the top coil to bottom coil, or in the opposite direction, magnetic flux is generated in the main pole and is used to write one or more bits in a magnetic medium proximate to the ABS; and
   (d) a capacitor electrically connected to the bottom coil that shunts the write current in the bottom coil at certain write current frequencies based on a capacitance of the capacitor.

2. The PMR writer of claim 1 wherein the capacitor is formed on a bottom electrode that is electrically connected to the interconnect through a center portion of the bottom coil, and wherein a top electrode is formed on the capacitor and contacts a back portion of the bottom coil, or a pad on a back portion of the bottom coil.

3. The PMR writer of claim 1 wherein the capacitor is formed on a bottom electrode that is electrically connected through a first lead to a bottom coil pad on a back portion of the bottom coil, and wherein a top electrode is formed on the capacitor and the top electrode is electrically connected to a center portion of the bottom coil through a second lead.

4. The PMR writer of claim 1 further comprised of a read head in a combined read-write head configuration, and wherein the capacitor is formed within an insulation layer and below a bottom shield in the read head, and is electrically connected to the bottom coil through via connections.

5. The PMR writer of claim 1 wherein the capacitor has a dielectric constant greater than 10.

6. The PMR writer of claim 5 wherein the capacitor is comprised of TaOx, TiOx, Al-doped $TiO_2$, or $TiO_2$.

7. The PMR writer of claim 5 wherein the capacitor is a dielectric layer having a thickness ≤75 nm and a unit area of ≥0.0155 m².

8. The PMR writer of claim 7 wherein the capacitor has a capacitance from about 0.05 nanoFarad (nF) to 1.0 nF.

9. The PMR writer of claim 1 wherein the PMR writer has a recessed dual write shield with back gap connection, dual write shield with back gap connection, dual write shield with no back gap connection, or a non dual write shield design.

10. The PMR writer of claim 9 wherein the PMR writer is further comprised of an ultimate double yoke (uDY) scheme for a top yoke above the main pole and below a front portion of the top coil.

11. The PMR writer of claim 1 wherein the top and bottom coils have a pancake design or a helical design.

12. A head gimbal assembly (HGA) comprising:
    (a) the PMR writer of claim 1; and
    (b) a suspension that elastically supports the PMR writer, wherein the suspension has a flexure to which the PMR writer is joined, a load beam with one end connected to the flexure, and a base plate connected to the other end of the load beam.

13. A magnetic recording apparatus, comprising:
    (a) the HGA of claim 12;
    (b) a magnetic recording medium positioned opposite to a slider on which the PMR writer is formed;
    (c) a spindle motor that rotates and drives the magnetic recording medium; and
    (d) a device that supports the slider, and that positions the slider relative to the magnetic recording medium.

* * * * *